United States Patent
Hong et al.

(10) Patent No.: US 9,301,285 B2
(45) Date of Patent: Mar. 29, 2016

(54) METHOD AND APPARATUS FOR CONTENTION-BASED CHANNEL ACCESS WITH DIRECTIONAL ANTENNA OVER WIDEBAND HIGH FREQUENCY WIRELESS SYSTEM

(71) Applicant: INTELLECTUAL DISCOVERY CO., LTD., Seoul (KR)

(72) Inventors: Seung Eun Hong, Daejeon (KR); Yong Sun Kim, Gyeryong-si (KR); Woo Yong Lee, Daejeon (KR); Hyun Kyu Chung, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/319,408

(22) Filed: Jun. 30, 2014

(65) Prior Publication Data

US 2014/0314019 A1 Oct. 23, 2014

Related U.S. Application Data

(63) Continuation of application No. 13/252,476, filed on Oct. 4, 2011, now Pat. No. 8,780,803.

(30) Foreign Application Priority Data

Oct. 4, 2010 (KR) .......... 10-2010-0096190
Aug. 23, 2011 (KR) .......... 10-2011-0083893

(51) Int. Cl.
*H04W 72/04* (2009.01)
*H04W 48/08* (2009.01)
(Continued)

(52) U.S. Cl.
CPC .......... *H04W 72/0406* (2013.01); *H04W 48/08* (2013.01); *H04W 74/0816* (2013.01); *H04W 48/10* (2013.01); *H04W 48/16* (2013.01); *H04W 72/04* (2013.01); *H04W 72/12* (2013.01); *H04W 74/08* (2013.01); *H04W 74/085* (2013.01); *H04W 74/0891* (2013.01)

(58) Field of Classification Search
None
See application file for complete search history.

(56) References Cited

U.S. PATENT DOCUMENTS 7,940,692 B2  5/2011  Igarashi et al.
8,089,947 B2  1/2012  Cordeiro et al.
(Continued)

FOREIGN PATENT DOCUMENTS

KR   2010-0025942 A   3/2010

OTHER PUBLICATIONS

IEEE Std 802.15.3™—2003, IEEE Computer Society, Sep. 29, 2003, pp. 8, 108-110, 138-142, 116-117 and 179-180.*
(Continued)

*Primary Examiner* — Joseph Bednash
(74) *Attorney, Agent, or Firm* — Rabin & Berdo, P.C.

(57) ABSTRACT

Provided are a method of performing contention based channel access by classifying a contention period into a beamformable contention period in which a beamforming is allowed and a non-beamformable contention period in which the beamforming is interrupted so as to resolve an issue regarding channel access occurring due to an introduction of a directional antenna for handling a path loss in a wideband wireless communication system according to an embodiment of the present invention, and a method for maximizing a spatial reuse gain by managing, for each direction, information about a transmission time of a message received from a dispersion device.

21 Claims, 11 Drawing Sheets

(51) Int. Cl.
*H04W 48/16* (2009.01)
*H04W 72/12* (2009.01)
*H04W 74/08* (2009.01)
*H04W 48/10* (2009.01)

(56) References Cited

U.S. PATENT DOCUMENTS

2009/0232063 A1 9/2009 Cordeiro et al.
2009/0273520 A1* 11/2009 Shao et al. .................... 342/417
2010/0110981 A1* 5/2010 Shao et al. .................... 370/328
2011/0075642 A1 3/2011 Cordeiro et al.

OTHER PUBLICATIONS

EEE Std 802.15.3™—2003, IEEE Computer Society, Sep. 29, 2003, pp. 8, 108-110, 116, 117, 138-142 and 179-180.*
IEEE Std 802.15.3b™—2005 (Amendment to IEEE Std 802.15.3™—2003), IEEE Computer Society, May 5, 2006, pp. iv and 101.*
IEEE Std 802.15.3c™—2009, IEEE Computer Society, Oct. 12, 2009, pp. 3, 26-27, 32-34, 45-49, 147-150 and 155-167.*

* cited by examiner

METHOD AND APPARATUS FOR CONTENTION-BASED CHANNEL ACCESS WITH DIRECTIONAL ANTENNA OVER WIDEBAND HIGH FREQUENCY WIRELESS SYSTEM

CROSS-REFERENCE TO RELATED APPLICATIONS

The present application is a Continuation Application of co-pending U.S. application Ser. No. 13/252,476, filed on Oct. 4, 2011, and claims the benefit of Korean Patent Applications No. 10-2010-0096190, filed on Oct. 4, 2010 and No. 10-2011-0083893, filed on Aug. 23, 2011, the subject matter of which is herein incorporated by reference.

BACKGROUND

1. Field of the Invention

The present invention relates to a method for resolving an issue regarding channel access due to an introduction of a directional antenna for handling a path loss, and maximizing a spatial reuse gain in a wireless communication system in which data may be transmitted at a relatively high speed through use of an ultra-wideband frequency band.

2. Description of the Related Art

A Carrier Sense Multiple Access with Contention Avoidance (CSMA/CA) scheme for a wireless local area network (LAN) system using a frequency band of 2.4 GHz or 5 GHz has been developed on the assumption of using an omnidirectional antenna and thus, may involve several issues when a directional antenna is used. A transmission through the directional antenna may concentrate a signal in a predetermined direction, thereby extending a signal reach distance in comparison with the omnidirectional antenna, and may enable concurrent communication in different directions using a spatial reuse gain. However, a system performance may deteriorate due to increases in a deafness issue and a hidden node issue. Even though the hidden node issue may occur when the omnidirectional antenna is used, the hidden node issue may be effectively resolved by transmitting a ready to send (RTS) control frame and a clear to send (CTS) control frame before exchanging a DATA/acknowledgement (ACK) packet.

Here, a deafness issue may refer to a state in which a reception node fails to receive an RTS control frame of a transmission node. When a reception node fails to receive an RTS control frame of a transmission node, the node transmitting the RTS control frame may attempt retransmission of the RTS control frame. In this instance, the transmission node may double a contention window of the transmission node according to a CSMA/CA protocol, thereby delaying a channel access time. Due to a continuous deafness, data packets to be transmitted may be deleted in a repeated manner.

The hidden node issue may refer to an issue of degrading a system performance due to packets including an RTS control frame that create errors in communication occurring around the corresponding node. Here, the packets may be transmitted by the corresponding node not recognizing communication occurring around the corresponding node.

Nowadays, a millimeter wave communication system based on a 60 GHz frequency band is being developed on the assumption of using a directional antenna due to a millimeter wave propagation characteristic. The millimeter wave communication system may perform a beamforming process to set a link to a destination device when the directional antenna is used. The beamforming process may correspond to a process of generating a plurality of beams being used in a predetermined area, identifying a predetermined destination device by transmitting signals in all directions, successively using beams, and then forming a link for a data transmission by forming relatively delicate beams. The millimeter wave communication system recognizing a CSMA/CA issue occurring when a directional antenna is used may schedule a time division multiple access (TDMA) resource allocation using a central control unit such as an access point (AP), and may enable device pairs predetermined in a scheduled TDMA resource to communicate, thereby resolving the CSMA/CA issue. However, when traffic is generated intermittently, a TDMA scheme may not use resources effectively and thus, the TDMA scheme may be used in combination with a CSMA/CA scheme. To effectively apply the CSMA/CA scheme to the millimeter wave communication system, a spatial reuse gain may be maximized while resolving issues described in the foregoing.

SUMMARY

An aspect of the present invention provides an apparatus and method for contention based channel access using a directional antenna in a wideband wireless communication system.

Another aspect of the present invention also provides a central process device in a wideband wireless communication system for generating and transmitting a beacon message that includes information about a beamformable contention period and a non-beamformable contention period.

Still another aspect of the present invention also provides a dispersion device in a wideband wireless communication system that performs a beamforming in a beamformable contention period and performs communication in a non-beamformable contention period.

Yet another aspect of the present invention also provides a method and apparatus for devising an effective Carrier Sense Multiple Access with Contention Avoidance (CSMA/CA) communication scheme through help of a central control unit such as a base station, and enhancing a spatial reuse gain using a the CSMA/CA communication scheme in a system allowing beamforming and high-speed communication using a directional antenna and a millimeter wave including a 60 GHz frequency band.

According to an aspect of the present invention, there is provided a central control unit for providing contention based channel access in a wideband wireless communication system, the central control unit including an information collector to receive, from dispersion devices in a network, information about participating in a contention period and information related to setting a receiving antenna, a source allocation scheduling unit to allocate a resource by dividing the contention period into a beamformable contention period corresponding to a contention period in which a beamforming of a directional antenna is allowed and a non-beamformable contention period corresponding to a contention period in which the beamforming is interrupted, and a beacon generator to generate a beacon message including information about the beamformable contention period and the non-beamformable contention period, and to transmit the beacon message to the dispersion devices.

According to another aspect of the present invention, there is provided a dispersion to device for providing contention based channel access in a wideband wireless communication system, the central control unit including a requesting unit to request a central control unit to participate in a contention period, a beacon processing unit to verify, in a beacon message received from the central control unit, a beamformable contention period corresponding to a contention period in which a beamforming is allowed and a non-beamformable contention period corresponding to a contention period in which the beamforming is interrupted, a beamforming unit to perform beamforming with a dispersion device to communicate in the beamformable contention period, and a data processing unit to process data transmitted to and received from the dispersion device to communicate in the non-beamformable contention period through a beam formed by the beamforming unit.

According to still another aspect of the present invention, there is provided a dispersion device for providing contention based channel access in a wideband wireless communication system, the central control unit including a direction detector to measure a receiving direction of a directional signal received during an omnidirectional receiving antenna mode, a duration controller to manage, for each predetermined direction, information of a transmission duration corresponding to a network allocation vector included in a message that is wirelessly received in a state set to the omnidirectional receiving antenna mode, and a media access control (MAC) layer unit to start communication when information of a transmission duration of a predetermined direction managed by the duration controller is "0" by verifying the information of the transmission duration of the predetermined direction for communication in the predetermined direction.

According to yet another aspect of the present invention, there is provided a method of providing contention based channel access in a central control unit of a wideband wireless communication system, the method including receiving, from dispersion devices in a network, information about participating in a contention period and information related to setting a receiving antenna, allocating a resource by dividing the contention period into a to beamformable contention period corresponding to a contention period in which a beamforming of a directional antenna is allowed and a non-beamformable contention period corresponding to a contention period in which the beamforming is interrupted, and generating a beacon message including information about the beamformable contention period and the non-beamformable contention period, and transmitting the beacon message to the dispersion devices.

According to further another aspect of the present invention, there is provided a method of providing contention based channel access in a dispersion device of a wideband wireless communication system, the method including requesting a central control unit to participate in a contention period, verifying, in a beacon message received from the central control unit, a beamformable contention period corresponding to a contention period in which a beamforming is allowed and a non-beamformable contention period corresponding to a contention period in which the beamforming is interrupted, performing beamforming with a dispersion device to communicate in the beamformable contention period, and exchanging data with the dispersion device to communicate in the non-beamformable contention period through a beam formed by performing the beamforming.

According to embodiments of the present invention, it is possible to limit, to a beamformable contention period, interference between adjacent devices occurring during a beamforming operation, and enable devices to perform communication in a more effective contention scheme using a central control unit that divides a contention period into a beamformable contention period and a non-beamformable contention period and allocates the divided contention period. According to embodiments of the present invention, it is possible to enhance a rate of channel use by providing a relatively large amount of information to devices participating in a contention period so as to reduce unsuccessful attempts at communication using a dispersion device that informs a central control unit about information as to whether to participate in the contention period and related to setting a receiving antenna during a participation. According to embodiments of the present invention, it is possible to enhance a number of concurrent transmissions, through spatial reuse, using a dispersion device that manages and sets information of a transmission duration for each direction recognized by the dispersion device.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
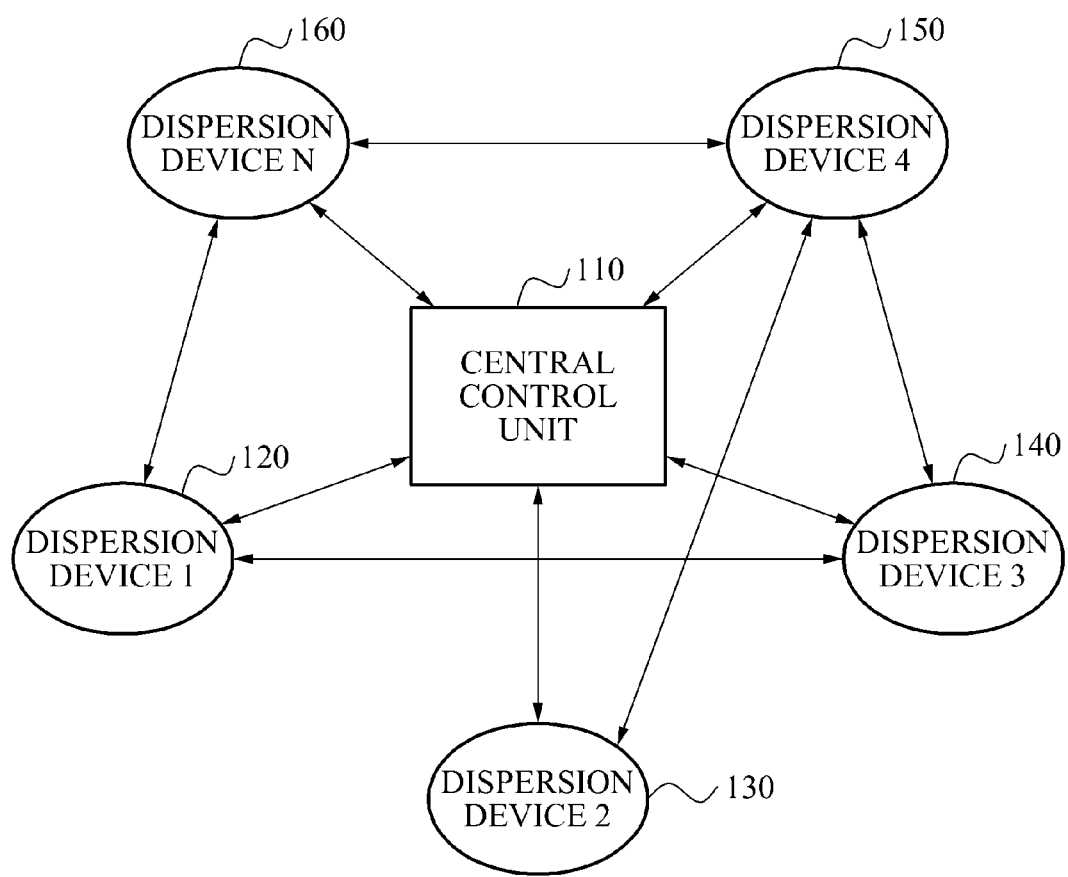
FIG. 1 is a diagram illustrating a configuration of a wideband wireless communication system according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a wideband wireless communication system according to embodiments of the present invention.

Referring to FIG. 1, in a wideband wireless communication system where discrete dispersion devices 120 through 160 wirelessly exchange signals, a single central control unit 110 may perform a resource allocation and a time synchronization between devices, and the dispersion devices 120 through 160 may use a system architecture performing communication based on information of the time synchronization and the resource allocation signaled by the central control unit 110.

The system architecture according to embodiments of the present invention may be similar to a common cellular network and a wireless local area network (LAN) having an access point (AP). However, while communication is performed between a terminal and a base station or between a terminal and an AP in the cellular network and the wireless LAN having an AP, communication may be performed directly between dispersion devices in a wireless architecture based on the present invention. Further, while signals transmitted by a single device are propagated in all directions in a conventional cellular network and wireless LAN system, the present invention is based on a wireless device using a directional antenna so that a data communication signal may be propagated in a predetermined direction by performing a beamforming to enhance a transmitting and receiving antenna gain.

Figure 2:
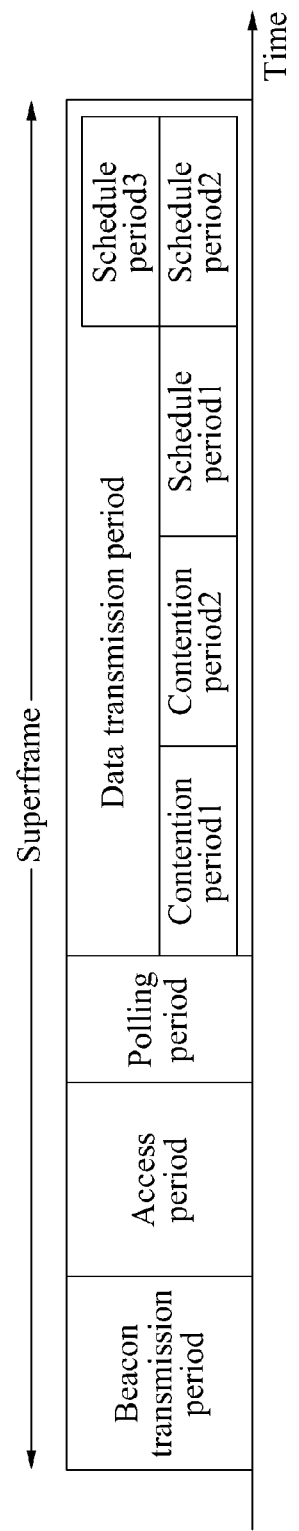
FIG. 2 is a diagram illustrating an example of a superframe used in a wideband wireless communication system according to embodiments of the present invention.

The central control unit 110 of FIG. 1 may share the information of the time synchronization and the resource allocation with devices by transmitting a beacon message to all devices, thereby forming a communication structure illustrated in FIG. 2.

FIG. 2 is a diagram illustrating an example of a superframe used in a wideband wireless communication system according to embodiments of the present invention.

A central control unit may load a beacon message with information of a time synchronization and information of a time resource allocation, and deliver the beacon message to all devices. The central control unit may repeatedly transmit beacon messages based on a number of supported sectors. Dispersion devices may set a receiving antenna to have as wide beam width as possible so as to receive a beacon message. In this instance, the beam having a wide width may be referred to as a Quasi-omni reception beam. Since the beacon message includes significant information, and receiving antenna gains of reception devices are relatively low, a relatively reliable modulation and coding scheme (MCS) may be used. The beacon message may include allocation information of a time resource indicating an access period, allocation information of a time resource indicating a polling period, and allocation information of a time resource indicating a data transmission period. The access period may correspond to a period in which devices receiving a beacon in a beacon transmission period perform a beamforming with a central control unit, thereby enhancing a transmitting antenna gain. A dispersion device may repeatedly transmit a message for a beamforming to the central control unit in the access period, thereby aligning a beam to the central control unit. In this instance, the dispersion device may inform the central control unit about beam information of the central control unit acquired through receiving the beacon message, thereby informing the central control unit about beam information to be used when the central control unit transmits a message to the corresponding device. The polling period may correspond to a time period in which the central control unit transmits a message to a predetermined device, and a device receiving the message transmits a message to the central control unit in response to the reception. The data transmission period may include time resource periods in which dispersion devices and the central control unit may communicate with each other. The data transmission period may include a contention period available to all devices and a schedule period available to predetermined transmission and reception devices, and at least one contention period and at least one schedule period may be included.

The data transmission period may include only contention periods, may include only schedule periods, and may include a combination of the contention period and the schedule period as illustrated in FIG. 2. In the data transmission period, a beam alignment may be performed between dispersion devices by performing a beamforming between dispersion devices, and then data may be transmitted and received. A transmission device and a reception device performing a beamforming may change settings of a transmitting antenna and a receiving antenna, respectively. An antenna gain value may vary depending on a setting of an antenna and thus, a transmission and reception distance of a signal may vary.

Figure 3:
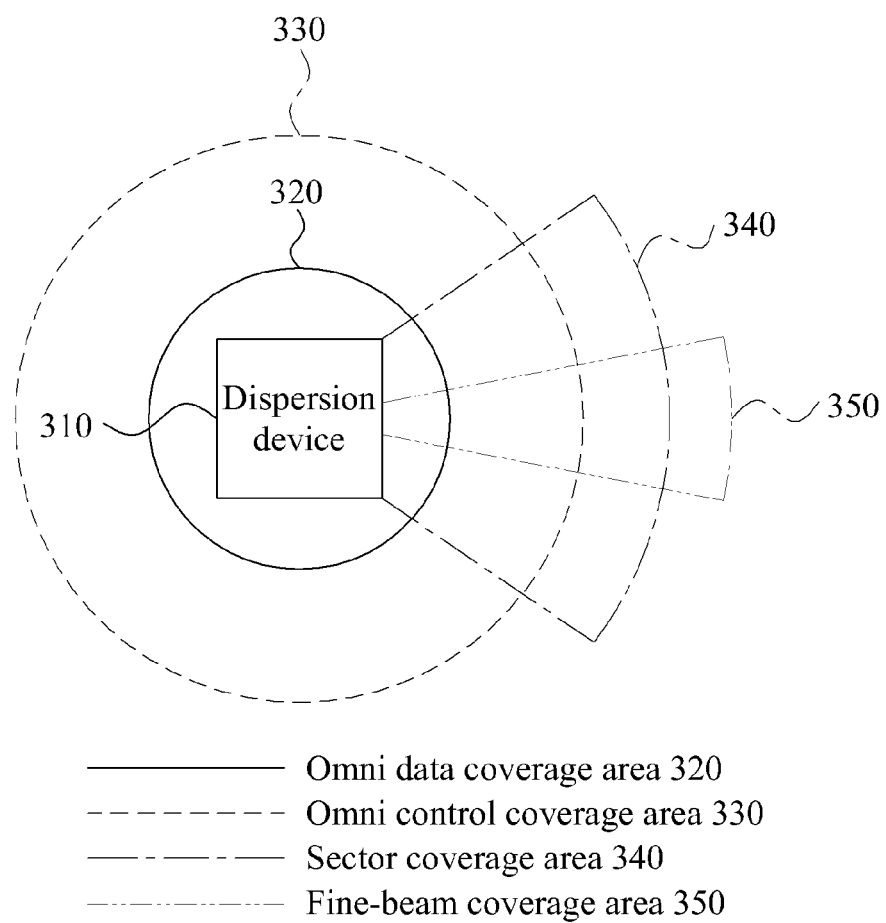
FIG. 3 is a diagram illustrating a signal reach distance formed by setting an antenna according to embodiments of the present invention.

FIG. 3 is a diagram illustrating a signal reach distance formed by setting an antenna according to embodiments of the present invention.

Referring to FIG. 3, the signal reach distance may increase as an antenna setting is changed from an omni direction to a sector, and to a beam level. Here, the omni direction may correspond to an omni data coverage area 320 and an omni control coverage area 330, the sector may correspond to a sector coverage area 340, and the beam level may correspond to a fine-beam coverage area 350. When an antenna is set to the omni direction, the signal reach distance may vary depending on an MCS value. Here, the omni control coverage area 330 indicates a distance where a control message, to which a relatively reliable MCS is applied, reaches, and the omni data coverage area 320 indicates a distance where transmitted data reaches.

A dispersion device 310 may have a longest communication distance when using the fine-beam coverage area 350. When communication is performed at a predetermined distance, and a transmission device and a reception device are properly aligned, a fine-beam may acquire a relatively excellent communication quality. However, when the fine-beam is used, a signal may be delivered to a device at a position to which a directional beam fails to be directed. Thus, a dispersion device to communicate may be identified prior to a fine-beam setting through a beamforming. To identify the dispersion device, a dispersion device 410 of FIG. 4 may use a sector sweep scheme of transmitting a control signal for a beamforming successively using all separate sectors among supported sectors.

Figure 4:
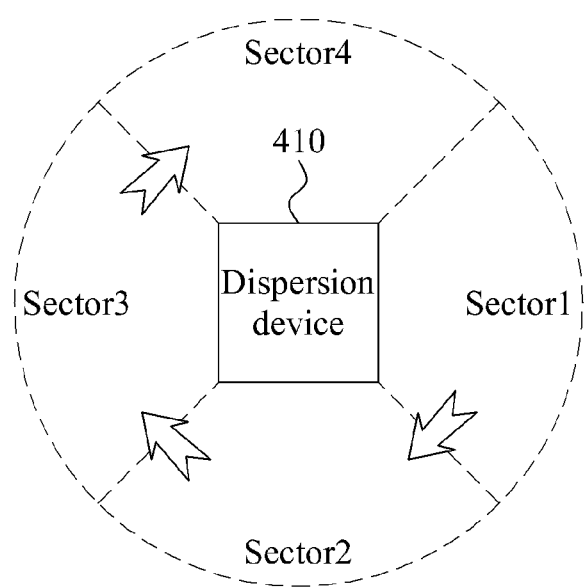
FIG. 4 is a diagram illustrating a sector sweep for transmitting and receiving an omnidirectional signal using a directional antenna according to embodiments of the present invention.

FIG. 4 is a diagram illustrating a sector sweep for transmitting and receiving an omnidirectional signal using a directional antenna according to embodiments of the present invention.

When a transmission dispersion device performs a sector sweep, a reception dispersion device may attempt to receive signals in all directions, and may successively use reception sectors as an alternative to. As a result, the reception dispersion device may recognize sector information, which may be referred to as an optimal transmission sector, having a relatively excellent reception signal quality, and may allow the transmission dispersion device to determine a sector to be used by feeding back the sector information. When feeding back the optimal transmission sector, a transmission and reception device may change a function, and perform the sector sweep. As a result, a communication device may determine an optimal sector used for communication with an opponent device. A scheme of determining a fine-beam may be similar to the sector sweep scheme.

The operation of performing a sector sweep and determining a fine-beam may be referred to as a beamforming operation. The beamforming operation may be performed in a schedule period or a contention period. To perform the beamforming operation in a schedule period, a dispersion device starting a beamforming operation may request a central control unit for a schedule period, and may use an allocated schedule period. In this instance, two dispersion devices performing the beamforming operation may correspond to devices communicating in the allocated schedule period. In the contention period in which the central control unit permits all dispersion devices desiring to communicate to access the central control unit, communication may be performed through a contention based on a Carrier Sense Multiple Access with Contention Avoidance (CSMA/CA) scheme. When omnidirectional communication is performed, simultaneous transmissions by at least two dispersion devices may cause a collision. However, when a sector or a fine-beam is used, a collision may be avoided depending on a direction of delivering a signal even though simultaneous transmissions occur. When a dispersion device transmitting a signal in the contention period does not perform a beamforming with a destination dispersion device, the sector sweep illustrated in FIG. 4 may be performed, which may significantly interfere with other dispersion devices. Further, in the contention period, dispersion devices at a transmission end and at a reception end may not verify each other, and whether the opponent prepares for communication. Also, the devices may not be informed of a receiving antenna setting of the opponent, which may not be an issue for the schedule period since the central control unit may designate a transmission and reception dispersion device of the corresponding schedule period through a message such as a beacon.

Figure 5:
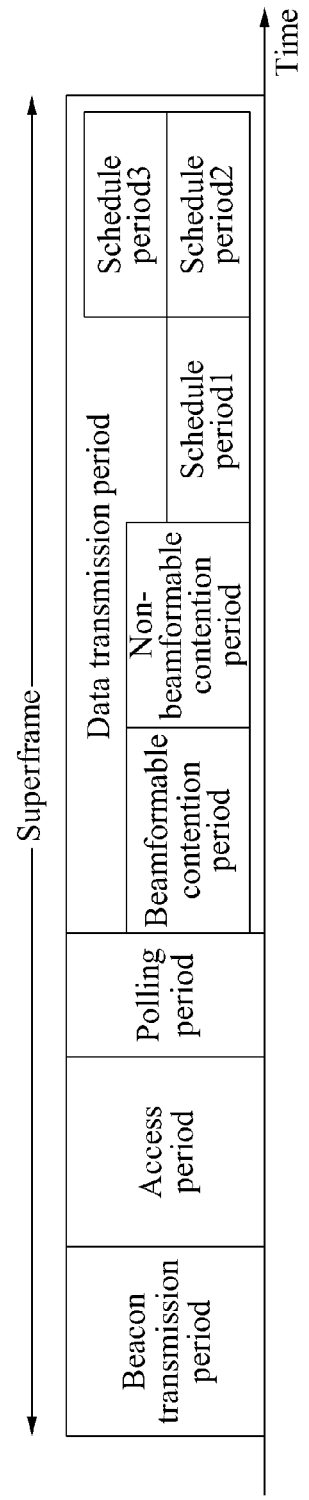
FIG. 5 is a diagram illustrating an example of a superframe including a beamformable contention period and a non-beamformable contention period according to embodiments of the present invention.

Accordingly, according to embodiments of the present invention, the central control unit may allocate a beamformable contention period corresponding to a contention period during which a beamforming including a sector sweep operation is allowed and a non-beamformable contention period corresponding to a contention period during which the beamforming is interrupted as illustrated in FIG. 5. In the non-beamformable contention period, dispersion devices may attempt access upon completing a beamforming.

FIG. 5 is a diagram illustrating an example of a superframe including a beamformable contention period and a non-beamformable contention period according to embodiments of the present invention.

A device desiring to perform a beamforming may receive an allocation of a schedule period and perform the beamforming, or may perform the beamforming in the beamformable contention period. By classifying a contention period into the beamformable contention period and the non-beamformable contention period, communication efficiency may be enhanced in the non-beamformable contention period. A central control unit may continuously dispose a beamformable contention period and a non-beamformable contention period in a data transmission period, and may schedule one of a beamformable contention period and a non-beamformable contention period as necessary. Various schemes may be used to signal to all devices by classifying contention periods into a beamformable contention period and a non-beamformable contention period, and a basic scheme may classify contention periods using "0" and "1" by adding one-bit information.

A signaling of the central control unit may be used to identify an antenna setting of reception dispersion devices participating in a contention period. A dispersion device participating in a contention period may report, to the central control unit, a receiving antenna mode set in the contention period in advance. When the central control unit signals an allocation of a contention period, the central control unit may also signal a receiving antenna setting of each of dispersion devices participating in the corresponding contention period. Information about a receiving antenna setting reported by a predetermined dispersion device participating in a contention period may be set in a varied manner, and may be indicated by a sector number as illustrated in FIG. 4. A dispersion device performing a beamforming with the predetermined dispersion device may recognize an antenna setting of a dispersion device indicated by a sector number and thus, may determine whether communication with a dispersion device having an indicated sector number in a contention period is allowed, and may determine a transmission sector or a fine-beam to be used for communication.

The central control unit may transmit, to dispersion devices, a contention period participation list including information about dispersion devices participating in a contention period and information related to setting a receiving antenna for each of the dispersion devices participating in the contention period. In this instance, the contention period participation list may be included in a message, for example, a beacon transmitted to all devices by the central control unit, and the message including the contention period participation list may be transmitted to a dispersion device. The dispersion device acquiring the contention period participation list may verify dispersion devices waiting for a reception in the corresponding contention period, and information related to setting a receiving antenna for the dispersion devices.

A configuration of a central control unit and a dispersion device according to embodiments of the present invention will be described with reference to FIG. 6 and FIG. 7.

Figure 6:
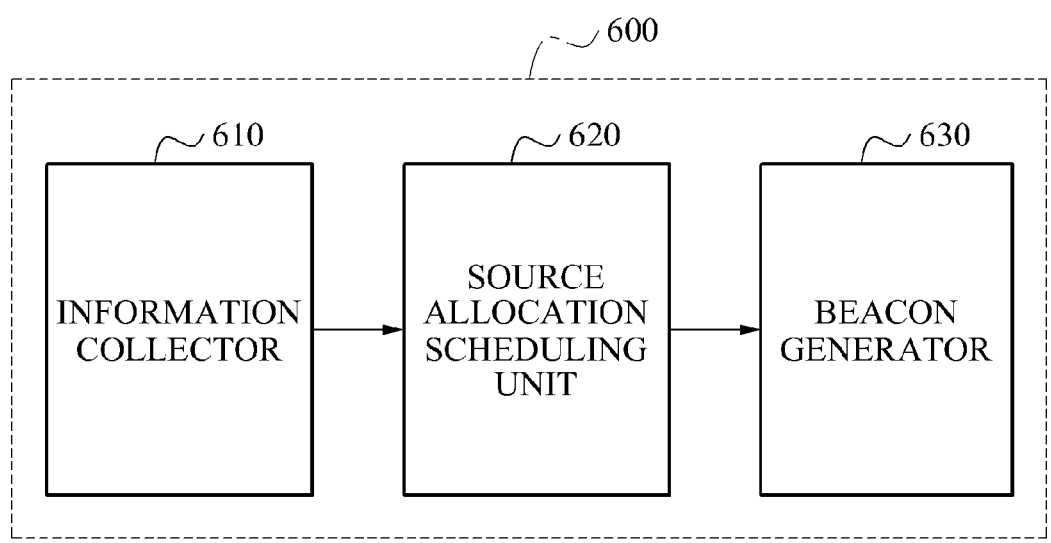
FIG. 6 is a block diagram illustrating a configuration of a central control unit for providing contention based channel access in a wideband wireless communication system according to embodiments of the present invention.

FIG. 6 is a block diagram illustrating a configuration of a central control unit 600 for providing contention based channel access in a wideband wireless communication system according to embodiments of the present invention. Referring to FIG. 6, the central control unit 600 includes an information collector 610, a source allocation scheduling unit 620, and a beacon generator 630.

The information collector 610 may receive, from dispersion devices in a network, information about participating in a contention period and information related to setting a receiving antenna.

The source allocation scheduling unit 620 may schedule a data transmission period including at least one of a beamformable contention period, a non-beamformable contention period, and a schedule period based on a request for a resource from the dispersion devices. In this instance, the source allocation scheduling unit 620 may allocate a resource by dividing the contention period into the beamformable contention period corresponding to a contention period in which a beamforming of a directional antenna is allowed and the non-beamformable contention period corresponding to a contention period in which the beamforming is interrupted.

The beacon generator 630 may generate a beacon message including information about the beamformable contention period and the non-beamformable contention period, and may transmit the beacon message to the dispersion devices. The beacon message may include allocation information of a time resource indicating an access period, allocation information of a time resource indicating a polling period, and allocation information of a time resource indicating a data transmission period. The data transmission period may include at least one of the beamformable contention period, the non-beamformable contention period, and the schedule period.

The beacon message may further include a contention period participation list including information about dispersion devices participating in the contention period and information related to setting a receiving antenna for each of the dispersion devices participating in the contention period.

All of the information collector 610, the source allocation scheduling unit 620, and the beacon generator 630 may be included in a media access control (MAC) layer of the central control unit 600.

Figure 7:
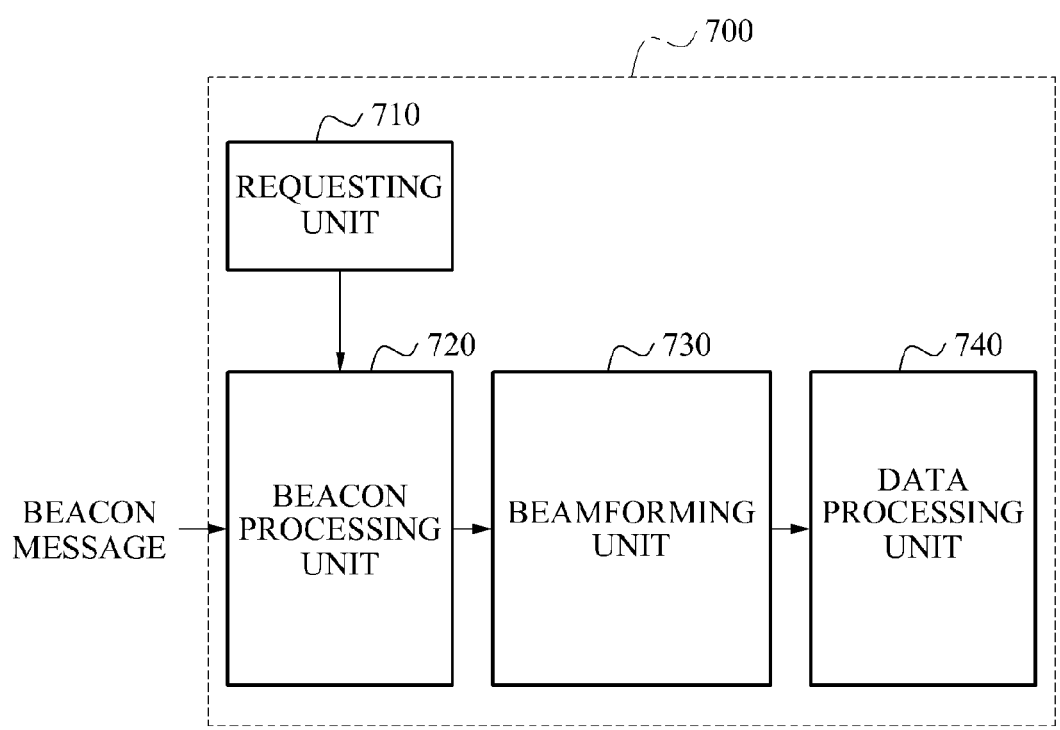
FIG. 7 is a block diagram illustrating a configuration of a dispersion device for providing contention based channel access in a wideband wireless communication system according to embodiments of the present invention.

FIG. 7 is a block diagram illustrating a configuration of a dispersion device 700 for providing contention based channel access in a wideband wireless communication system according to embodiments of the present invention. Referring to FIG. 7, the dispersion device 700 includes a requesting unit 710, a beacon processing unit 720, a beamforming unit 730, and a data processing unit 740.

The requesting unit 710 may request a central control unit to participate in a contention period. The requesting unit 710 may inform a central control unit of information related to setting a receiving antenna for the dispersion device when the requesting unit 710 requests participation in the contention period.

The beacon processing unit 720 may verify, in a beacon message received from the central control unit, a beamformable contention period corresponding to a contention period in which a beamforming is allowed and a non-beamformable contention period corresponding to a contention period in which the beamforming is interrupted. The beacon processing unit 720 may verify, in the beacon message, a contention period participation list including information about dispersion devices participating in the contention period and information related to setting a receiving antenna for each of the dispersion devices participating in the contention period.

The beamforming unit 730 may perform beamforming with a dispersion device to communicate in the beamformable contention period. The beamforming unit 730 may perform a beamforming by verifying information related to setting a receiving antenna for the dispersion device to communicate in the contention period participation list.

The data processing unit 740 may process data transmitted to and received from the dispersion device to communicate in the non-beamformable contention period through a beam formed by the beamforming unit 730.

The requesting unit 710, the beacon processing unit 720, the beamforming unit 730, and the data processing unit 740 may all be included in a MAC layer of the dispersion device 700.

Hereinafter, a method for contention based channel access using a directional antenna in a wideband wireless communication system according to embodiments of the present invention will be described with reference to FIG. 8 and FIG. 9.

Figure 8:
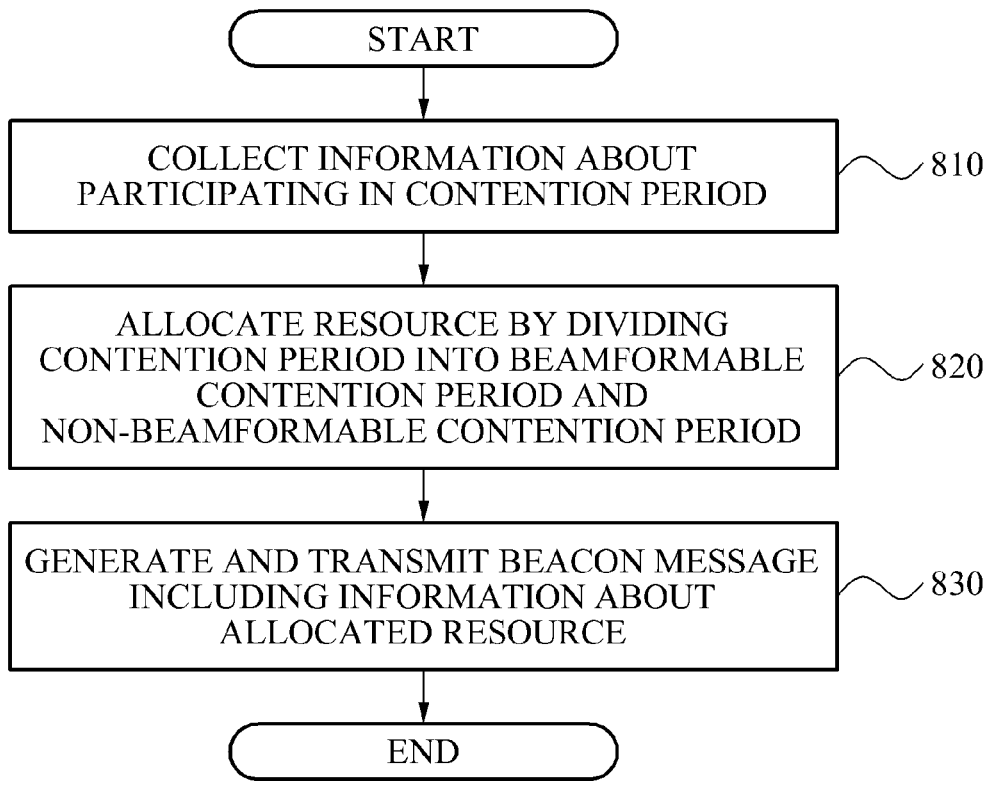
FIG. 8 is a flowchart illustrating a method for providing contention based channel access in a central control unit of a wideband wireless communication system according to embodiments of the present invention.

FIG. 8 is a flowchart illustrating a method for providing contention based channel access in a central control unit of a wideband wireless communication system according to embodiments of the present invention.

Referring to FIG. 8, in operation 810, the central control unit receives, from dispersion devices in a network, information about participating in a contention period and information related to setting a receiving antenna.

In operation 820, the central control unit schedules a data transmission period including at least one of a beamformable contention period, a non-beamformable contention period, and a schedule period based on a request for a resource from the dispersion devices. In this instance, the central control unit may allocate a resource by dividing the contention period into the beamformable contention period corresponding to a contention period during which a beamforming of a directional antenna is allowed and the non-beamformable contention period corresponding to a contention period during which the beamforming is interrupted.

In operation 830, the central control unit generates a beacon message including information about the beamformable contention period and the non-beamformable contention period, and transmits the beacon message to the dispersion devices.

Figure 9:
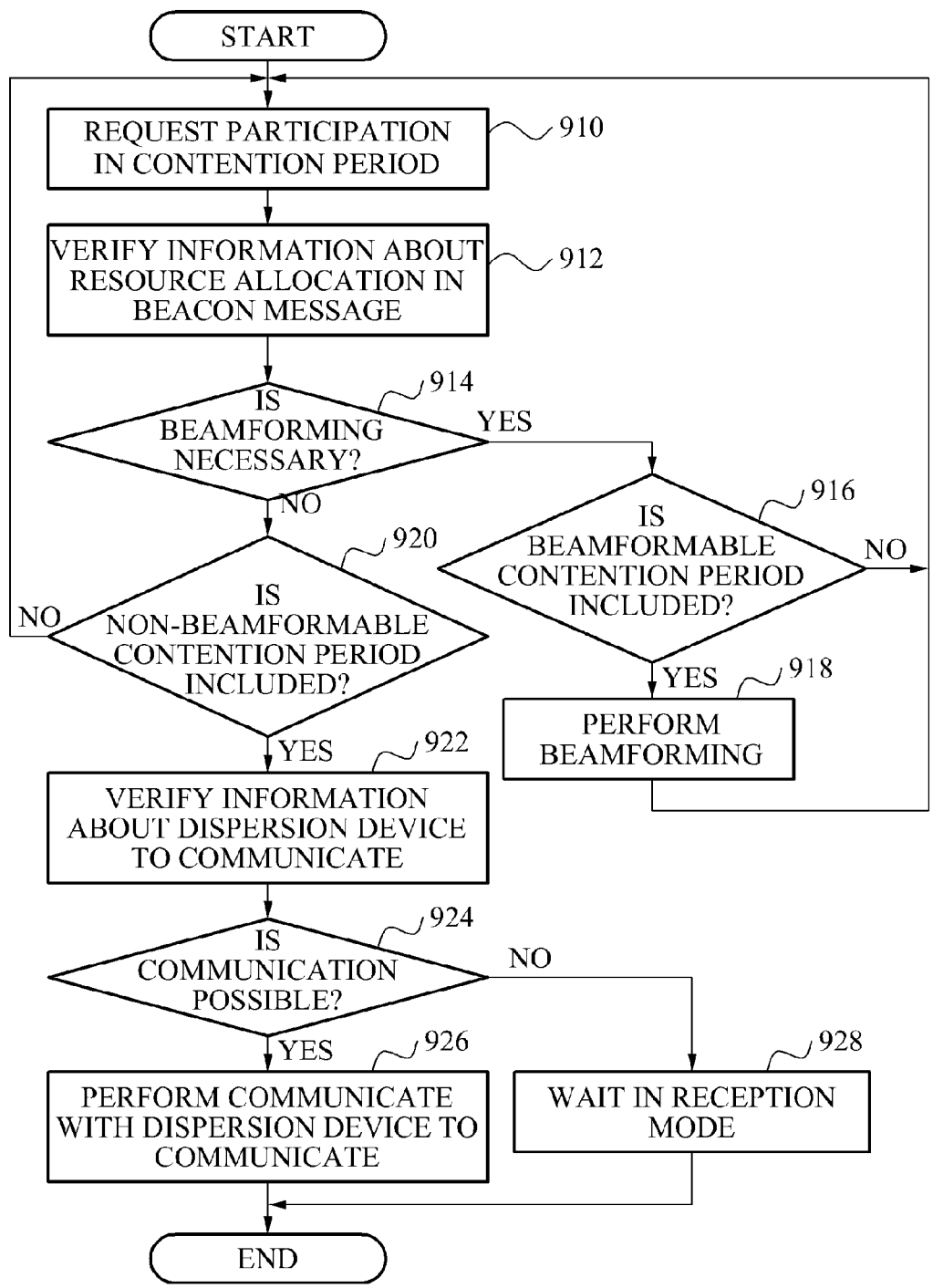
FIG. 9 is a flowchart illustrating a method for providing contention based channel access in a dispersion device of a wideband wireless communication system according to embodiments of the present invention.

FIG. 9 is a flowchart illustrating a method for providing contention based channel access in a dispersion device of a wideband wireless communication system according to embodiments of the present invention.

Referring to FIG. 9, in operation 910, the dispersion device requests a central control unit to participate in a contention period. In this instance, the dispersion device may inform a central control unit of information related to setting a receiving antenna for the dispersion device.

In operation 912, the dispersion device verifies information related to a resource allocation by receiving a beacon message from the central control unit.

In operation 914, the dispersion device verifies whether a beamforming is necessary.

When the beamforming is necessary as a result of the verification in operation 914, the dispersion device verifies whether a beamformable contention period is included in a data transmission period of a superframe in operation 916.

When the beamformable contention period is verified to be included in the data transmission period as a result of operation 916, the dispersion device performs a beamforming with a dispersion device to communicate in operation 918, and returns to operation 910. In this instance, when the beamformable contention period is excluded as a result of the verification in operation 916, the dispersion device returns to operation 910.

When the beamforming is not necessary since a beamforming is previously completed as a result of the verification in operation 914, the dispersion device verifies whether a non-beamformable contention period is included in the data transmission period of the superframe in operation 920.

When the non-beamformable contention period is excluded as a result of the verification in operation 920, the dispersion device returns to operation 910.

When the non-beamformable contention period is verified to be included in the data transmission period as a result of operation 920, the dispersion device verifies information related to whether a dispersion device to communicate participates in the contention period and information related to setting a receiving antenna for the dispersion device to communicate in operation 922.

In operation 924, the dispersion device verifies whether the dispersion device is allowed to communicate with the dispersion device based on information verified in operation 924.

When the dispersion device is allowed to communicate as a result of the verification in operation 924, the dispersion device performs communication with the dispersion device to communicate in operation 926. When the dispersion device is not allowed to communicate as a result of the verification in operation 924, the dispersion device waits in a reception mode in operation 928.

The present invention may provide a method for enhancing a number of concurrent transmissions through spatial reuse in the contention period. The dispersion device may operate using a CSMA/CA scheme in the contention period, and a network allocation vector (NAV) variable may be managed to avoid a collision due to a concurrent transmission. Here, the NAV variable may be used to determine whether a channel is occupied by another device, and to determine a period of time during which the channel is occupied. The NAV variable may be set to a packet length value in a time unit recorded in a header of a received packet, and the NAV variable, as a type of information of a transmission duration, may correspond to a duration field value within a MAC header of a received message.

For omnidirectional communication, the dispersion device may have a single NAV variable, and may set a duration field value of a received packet to an NAV variable value. The dispersion device may decrease the NAV variable value over time, and may delay a channel access until a point in time at which the NAV variable value becomes "0."

However, for directional communication, the dispersion device may start a transmission when the NAV variable value does not correspond to "0." Depending on a communication direction, the dispersion device may start a transmission when the NAV variable value exceeds "0."

Starting a transmission when the NAV variable value does not correspond to "0" will be described with reference to FIG. 10.

Figure 10:
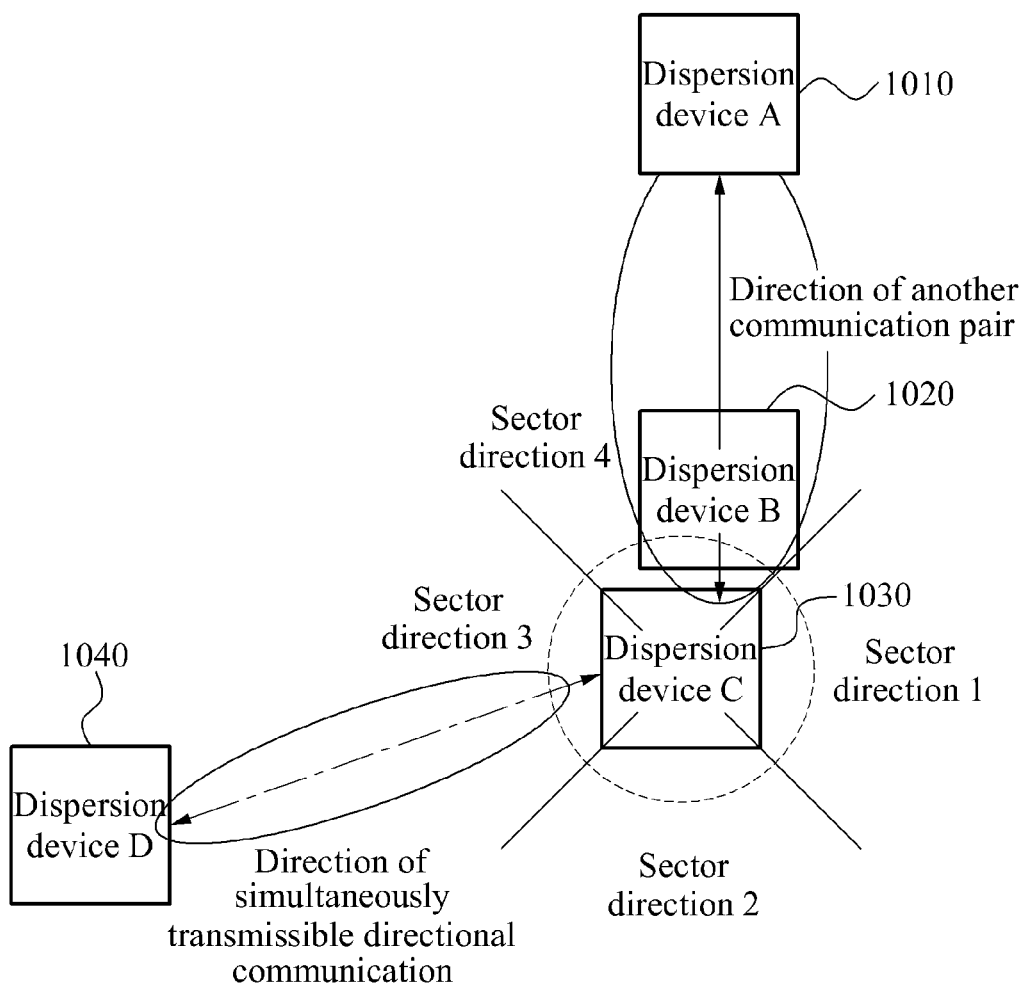
FIG. 10 is a diagram illustrating an example of communication in which spatial reuse is allowed according to embodiments of the present invention.

FIG. 10 is a diagram illustrating an example of communication in which spatial reuse is allowed according to embodiments of the present invention.

Referring to FIG. 10, when it is assumed that a dispersion device (C) 1030, among four dispersion devices (A through D) 1010 through 1040 participating in a contention period, has an omnidirectional receiving antenna setting, the dispersion device (C) 1030 may set an NAV value by a packet received through a communication link between the dispersion device (A) 1010 and the dispersion device (B) 1020. In this instance, a direction of receiving a packet through a communication link between the dispersion device (A) 1010 and the dispersion device (B) 1020 may correspond to a sector direction 4 of the dispersion device (C) 1030. Thus, when the dispersion device (C) 1030 desires to communicate with the dispersion device (D) 1040 in a sector direction 3, it may be efficient to start communication with the dispersion device (D) 1040 without waiting for the NAV value to become "0" even though the NAV value is set to a value greater than "0" by the communication link between the dispersion device (A) 1010 and the dispersion device (B) 1020. Accordingly, the present invention suggests a device for managing NAV variables of a number of directions that may be regulated. The NAV values may be set for each direction of a received packet, and communication in a predetermined direction may be started when an NAV value in the predetermined direction corresponds to "0."

Figure 11:
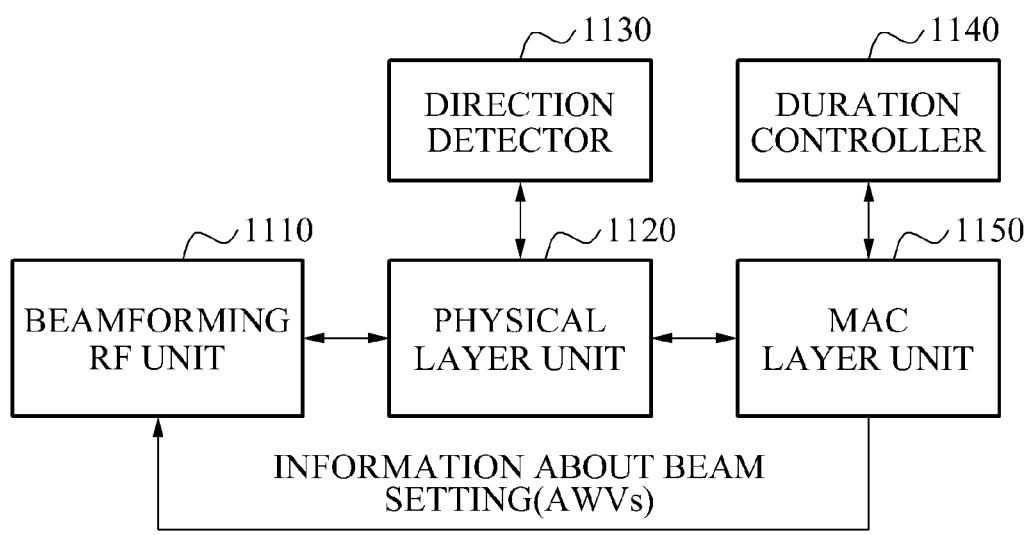
FIG. 11 is a diagram illustrating a configuration of a dispersion device that manages information of a transmission duration for each direction according to embodiments of the present invention.

FIG. 11 is a diagram illustrating a configuration of a dispersion device that manages information of a transmission duration for each direction according to embodiments of the present invention.

Referring to FIG. 11, the dispersion device includes a beamforming radio frequency (RF) unit 1110, a physical layer unit 1120, a direction detector 1130, a duration controller 1140, and an MAC layer unit 1150.

The beamforming RF unit 1110 may direct a transmission beam in a predetermined direction by adaptively changing phases and/or amplitudes of a plurality of power amplifiers (which may be referred to as an adaptive weight vector (AWV), and hereinafter referred to as a transmission AWV), and may direct a reception beam in a predetermined direction by adaptively changing phases and/or amplitudes of a plurality of low noise amplifiers (LNAs) (which may be referred to as a reception AWV). The beamforming RF unit 1110 may support an omnidirectional reception mode during a reception, and may receive information about a transmission and reception AWV from the MAC layer unit 1150 to direct a transmission and reception antenna in a predetermined direction.

The physical layer unit 1120 may correspond to a block performing a modulation and demodulation of a transmission and reception message and a coding and encoding of a channel, and may measure a quality of a reception message.

The direction detector 1130 may measure a receiving direction of a directional signal received during an omnidirectional receiving antenna mode.

The duration controller 1140 may manage, for each predetermined direction, information of a transmission duration corresponding to a network allocation vector included in a message that is wirelessly received in a state set to the omnidirectional receiving antenna mode. In this instance, the duration controller 1140 may manage the information of the transmission duration along with a transmission address of the received message, a reception address of the received message, and information of a receiving direction of the received message. The duration controller 1140 may verify the information of the transmission duration in a duration field within a MAC header of the received message.

The MAC layer unit 1150 may control access to a wireless medium for generating and transmitting a message to be wirelessly transmitted, and for analyzing a wirelessly received message. The MAC layer unit 1150 may perform a transmission and reception using a CSMA/CA scheme, and may deliver, to the beamforming RF unit 1110, an AWV corresponding to information related to an antenna setting for a transmission and reception to perform an antenna setting for the transmission and reception using the CSMA/CA scheme.

According to embodiments of the present invention, the MAC layer unit 1150 may start communication when information of a transmission duration of a predetermined direction managed by the duration controller is "0" by verifying the information of the transmission duration of the predetermined direction for communication in the predetermined direction.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A central control unit for providing contention based channel access in a wideband wireless communication system, the central control unit comprising:
a source allocation scheduling unit to allocate a resource by dividing the contention period into a sector sweepable contention period corresponding to a contention period during which a sector sweeping operation by a dispersion device in communication with the central control unit is performed and a non-sector sweepable contention period corresponding to a contention period during which the sector sweeping operation is not performed; and
a beacon generator to generate a beacon message including information about the sector sweepable contention period and the non-sector sweepable contention period, and to transmit the beacon message to the dispersion device,
wherein the dispersion device manages, for each of predetermined directions, information of a transmission duration corresponding to a network allocation vector included in a message that is wirelessly received in a state set to an omnidirectional receiving antenna mode, and
the dispersion device starts communication in a first direction among the predetermined directions when the information of the transmission duration of the first direction is a predetermined value.

2. The central control unit of claim 1, wherein the beacon generator sets the information about the sector sweepable contention period to 1 and sets the information about the non-sector sweepable contention period to 0.

3. The central control unit of claim 1, wherein the source allocation scheduling unit schedules a data transmission period including at least one of the sector sweepable contention period, the non-sector sweepable contention period, and a schedule period based on a request for a resource from the dispersion devices.

4. The central control unit of claim 1, wherein:
the beacon message includes allocation information of a time resource indicating an access period, allocation information of a time resource indicating a polling period, and allocation information of a time resource indicating a data transmission period, and
the data transmission period includes at least one of the sector sweepable contention period, the non-sector sweepable contention period, and a schedule period.

5. The central control unit of claim 1, further comprising an information collector to receive, from dispersion devices in a network, information about participating in the contention period and information related to setting a receiving antenna.

6. A dispersion device for providing contention based channel access in a wideband wireless communication system, the dispersion device comprising:
a beacon processing unit to verify, in a beacon message received from a central control unit, a sector sweepable contention period corresponding to a contention period during which a sector sweeping by the dispersion device is performed and a non-sector sweepable contention period corresponding to a contention period during which the sector sweeping is not performed;
a sector sweep performing unit to perform the sector sweeping with another dispersion device to communicate in the sector sweepable contention period; and
a data processing unit to process data transmitted to and received from the other dispersion device to communicate in the non-sector sweepable contention period based on result of the sector sweeping performed by the sector sweep performing unit,
wherein the dispersion device manages, for each of predetermined directions, information of a transmission duration corresponding to a network allocation vector included in a message that is wirelessly received in a state set to an omnidirectional receiving antenna mode, and
the dispersion device starts communication in a first direction among the predetermined directions when the information of the transmission duration of the first direction is a predetermined value.

7. The dispersion device of claim 6, wherein the beacon message comprises sector sweep information set to 1 indicates the sector sweepable contention period and set to 0 indicates the non-sector sweepable contention period.

8. The dispersion device of claim 6, wherein the beacon processing unit verifies, in the beacon message, a contention period participation list including information about dispersion devices participating in the contention period and information related to setting a receiving antenna for each of the dispersion devices participating in the contention period.

9. The dispersion device of claim 8, wherein the sector sweep performing unit performs the sector sweeping by verifying information related to setting a receiving antenna for the dispersion device to communicate in the contention period participation list.

10. The dispersion device of claim 6, wherein:
the beacon processing unit is configured to process information in the beacon message including allocation information of a time resource indicating an access period, allocation information of a time resource indicating a polling period, and allocation information of a time resource indicating a data transmission period, and
the data transmission period includes at least one of the sector sweepable contention period, the non-sector sweepable contention period, and a schedule period.

11. A method of providing contention based channel access in a central control unit of a wideband wireless communication system, the method comprising:
allocating a resource by dividing the contention period into a sector sweepable contention period corresponding to a contention period in which a sector sweeping operation by a dispersion device in communication with the central control unit is performed and a non-sector sweepable contention period corresponding to a contention period in which the sector sweeping operation is not performed; and
generating a beacon message including information about the sector sweepable contention period and the non-sector sweepable contention period, and transmitting the beacon message to the dispersion device,
wherein the dispersion device manages, for each of predetermined directions, information of a transmission duration corresponding to a network allocation vector included in a message that is wirelessly received in a state set to an omnidirectional receiving antenna mode, and the dispersion device starts communication in a first direction among the predetermined directions when the information of the transmission duration of the first direction is a predetermined value.

12. The method of claim 11, wherein the generating comprises setting the information about the sector sweepable contention period to 1 and setting the information about the non-sector sweepable contention period to 0.

13. The method of claim 11, wherein the allocating comprises scheduling a data transmission period including at least one of the sector sweepable contention period, the non-sector sweepable contention period, and a schedule period based on a request for a resource from the dispersion devices.

14. The method of claim 11, wherein:
the beacon message includes allocation information of a time resource indicating an access period, allocation information of a time resource indicating a polling period, and allocation information of a time resource indicating a data transmission period, and
the data transmission period includes at least one of the sector sweepable contention period, the non-sector sweepable contention period, and a schedule period.

15. The method of claim 13 further comprising,
receiving, from dispersion devices in a network, information about participating in the contention period and information related to setting a receiving antenna.

16. A method of providing contention based channel access in a dispersion device of a wideband wireless communication system, the method comprising:
verifying, in a beacon message received from a central control unit, a sector sweepable contention period corresponding to a contention period in which a sector sweeping operation by the dispersion device is performed and a non-sector sweepable contention period corresponding to a contention period in which the sector sweeping operation is not performed;
performing sector sweeping with another dispersion device to communicate in the sector sweepable contention period; and
exchanging data with the other dispersion device to communicate in the non-sector sweepable contention period based on result of the sector sweeping operation performed by the sector sweep performing unit,
wherein the dispersion device manages, for each of predetermined directions, information of a transmission duration corresponding to a network allocation vector included in a message that is wirelessly received in a state set to an omnidirectional receiving antenna mode, and
the dispersion device starts communication in a first direction among the predetermined directions when the information of the transmission duration of the first direction is a predetermined value.

17. The method of claim 16, wherein the becon message comprises sector sweep information set to 1 indicates the sector sweepable contention period and set to 0 indicates the non-sector sweepable contention period.

18. The method of claim 16, wherein the verifying comprises verifying, in the beacon message, a contention period participation list including information about dispersion devices participating in the contention period and information related to setting a receiving antenna for each of the dispersion devices participating in the contention period.

19. The method of claim 16, wherein the performing comprises performing the beamforming by verifying information related to setting a receiving antenna for the dispersion device to communicate in the contention period participation list.

20. The method of claim 16, wherein:
the verifying includes processing information in the beacon message including allocation information of a time resource indicating an access period, allocation information of a time resource indicating a polling period, and allocation information of a time resource indicating a data transmission period, and
the data transmission period includes at least one of the sector sweepable contention period, the non-sector sweepable contention period, and a schedule period.

21. The central control unit of claim 1, wherein the non-sector sweepable contention period corresponds to a period during which a beamforming of a directional antenna of a dispersion device is not allowed.

* * * * *